United States Patent
Hyot et al.

(10) Patent No.: US 8,092,887 B2
(45) Date of Patent: Jan. 10, 2012

(54) SUPER-RESOLUTION OPTICAL RECORDING MEDIUM

(75) Inventors: Bérangère Hyot, Eybens (FR); Bernard Andre, Quaix En Chartreuse (FR); Pierre Desre, Meylan (FR); Xavier Biquard, Tullins (FR)

(73) Assignee: Commissariat a l'Energie Atomique, Paris (FR)

( * ) Notice: Subject to any disclaimer, the term of this patent is extended or adjusted under 35 U.S.C. 154(b) by 818 days.

(21) Appl. No.: 12/062,067

(22) Filed: Apr. 3, 2008

(65) Prior Publication Data

US 2008/0273447 A1    Nov. 6, 2008

(30) Foreign Application Priority Data

Apr. 6, 2007  (FR) ..................... 07 02561

(51) Int. Cl.
B32B 3/02    (2006.01)
(52) U.S. Cl. .............. 428/64.1; 428/64.4; 428/64.5; 428/64.6; 430/270.13
(58) Field of Classification Search .............. None
See application file for complete search history.

(56) References Cited

U.S. PATENT DOCUMENTS

| | | | |
|---|---|---|---|
| 4,947,372 A * | 8/1990 | Koshino et al. | 365/106 |
| 5,153,873 A | 10/1992 | Spruit et al. | |
| 5,381,391 A | 1/1995 | Yanagisawa et al. | |
| 5,569,517 A | 10/1996 | Tominaga et al. | |
| 5,949,751 A | 9/1999 | Horikawa et al. | |
| 7,442,424 B2 * | 10/2008 | Hwang et al. | 428/64.4 |
| 2003/0002428 A1 | 1/2003 | Cheong et al. | |
| 2005/0244754 A1 * | 11/2005 | Van Pieterson et al. | 430/270.13 |
| 2005/0254408 A1 | 11/2005 | Hwang et al. | |

FOREIGN PATENT DOCUMENTS

| | | |
|---|---|---|
| JP | 03292632 | 12/1991 |
| JP | 07029206 | 1/1995 |

OTHER PUBLICATIONS

Jooho Kim et al. "Super-Resolution by Elliptical Bubble Formation with PtOx and AgInSbTe Layers". Applied Physics Letters, vol. 83, No. 9, Sep. 2003.
Jooho Kim et al. "Signal Characteristics of Super-Resolution Near-Filed Structure Disk in Blue Laser System." Japanese Journal of Applied Physics, vol. 43, No. 7B, 2004.
Duseop Yoon et al. "Super-Resolution Read-Only Memory Disk Using Super-Resolution Near-Field Structure Technology." Japanese Journal of Applied Physics vol. 43, No. 7B, 2004.
Hyunki Kim et al. "Random Signal Characteristics of Super-Resolution Near Field Structure Read-Only Memory Disk." Japanese Journal of Applied Physics vol. 45, No. 2B, 2006.

* cited by examiner

*Primary Examiner* — Elizabeth Mulvaney
(74) *Attorney, Agent, or Firm* — Lowe Hauptman Ham & Berner, LLP

(57) ABSTRACT

The invention relates to the field of optical information recording. According to the invention, an optical storage structure is proposed comprising a substrate equipped with physical marks whose geometrical configuration defines the recorded information, a superposition of three layers on top of the substrate marks, and a transparent protective layer on top of this superposition, the superposition comprising a layer of indium or gallium antimonide inserted between two ZnS/SiO$_2$ dielectric layers. The antimonide layer has a polycrystalline structure with an average crystal grain size between 5 and 50 nanometers. The non-linear behavior of the superposition of three layers under the read laser makes it possible to read information having a size below the theoretical resolution of the reading system.

20 Claims, 1 Drawing Sheet

SUPER-RESOLUTION OPTICAL RECORDING MEDIUM

RELATED APPLICATIONS

The present application is based on, and claims priority from, French Application Number 07 02561, filed Apr. 6, 2007, the disclosure of which is hereby incorporated by reference herein in its entirety.

FIELD OF THE INVENTION

The invention relates to the field of optical information recording.

BACKGROUND OF THE INVENTION

When it is sought to increase the density of information recorded on an optical disk, this objective is generally limited by the performance of the information read device. The basic principle is that the physical information written to the disk can only be read with great difficulty when its size is smaller than the resolution limit of the optical system which will be used to read this information. Typically, when reading with a red laser having a wavelength of 650 nm and a numerical aperture of 0.6, there is normally no hope of correctly reading information having a size below 0.4 microns, or at the limit 0.3 microns.

However, methods known as super-resolution methods have been devised for reading information whose physical size is smaller than, or even much smaller than the wavelength. These methods are based on the non-linear optical properties of certain materials. The expression "non-linear properties" is understood to mean the fact that certain optical properties of the material change depending on the intensity of the light that they receive. The read laser itself will locally modify the optical properties of the material via thermal, optical, thermooptical and/or optoelectronic effects on dimensions smaller than the dimension of the read laser spot; due to the change of properties, a piece of information present in this very small volume becomes detectable whereas it would not have been detectable without this change.

The phenomenon that is exploited is mainly based on two properties of the read laser that will be used:

on the one hand, the laser is very highly focused so as to have an extremely small cross section (of the order of the wavelength) but whose power distribution is Gaussian, very strong at its center, very attenuated at the periphery; and on the other hand, a read laser power is chosen such that the power density over a small part of the cross section, at the center of the beam, significantly modifies an optical property of the layer, whereas the power density outside of this small cross section portion does not significantly modify this optical property; the optical property is modified in a direction that tends to allow information to be read which would not be readable without this modification.

For example, the optical property which changes is an increase of the optical transmission in the case where the reading of one bit constituted by a physical mark formed on the optical disk requires a transmission of the laser beam to this physical mark. The non-linear layer is then interposed in the path of the beam towards the physical mark. The center of the laser beam will be able to pass through the layer as far as the mark due to the fact that by passing through the layer the intensity of the incident light makes said layer more transparent, whereas the periphery of the beam will not pass through as it does not modify the optical indices of the layer sufficiently to make it more transparent. Everything then takes place as if a beam focused over a much smaller diameter than that which its wavelength allows had been used.

Various theoretical propositions have been formulated to implement these principles, but none have given rise to an industrial development. Patent U.S. Pat. No. 5,153,873 recalls the theory. Patent U.S. Pat. No. 5,381,391 gives the example of a film having non-linear reflectivity properties. Patent U.S. Pat. No. 5,569,517 proposes various crystalline phase change materials.

Among the techniques which currently offer the strongest possibilities, there is the use of a platinum oxide ($PtO_x$) layer held between two layers of a compound of zinc sulfide and silicon oxide, the assembly being inserted between two layers of an AgInSbTe or GeSbTe compound and the assembly being again inserted between layers of a compound of zinc sulfide and silicon oxide. The AgInSbTe or GeSbTe material has phase change properties under the effect of an intense laser illumination. Examples will be found in Applied Physics Letters, Vol. 83, No. 9, Sept. 2003, Jooho Kim et al., "Super-Resolution by Elliptical Bubble Formation with $PtO_x$ and AgInSbTe Layers", and also in the Japanese Journal of Applied Physics, Vol. 43, No. 7B, 2004, Jooho Kim et al., "Signal Characteristics of Super-Resolution Near-Field Structure Disk in Blue Laser System", and in the same journal, Duseop Yoon et al., "Super-Resolution Read-Only Memory Disk Using Super-Resolution Near-Field Structure Technology". See also, Vol. 45, No. 2B, 2006, Hyunki Kim et al. "Random Signal Characteristics of Super-Resolution Near Field Structure Read-Only Memory Disk".

The structures described in these articles mainly rely on the formation of platinum oxide expansion bubbles, trapped between the layers that surround them. These bubbles are formed during laser writing and they may be recognized during read-out, even with a read laser having a wavelength equal to several times the size of the bubbles.

But these structures are difficult to produce and the control of the bubble volume is particularly sensitive. The adjustment of the laser power in order to obtain the super-resolution effect when reading is also particularly difficult, too low a laser power does not give any result and too high a laser power considerably reduces the number of read cycles possible.

SUMMARY OF THE INVENTION

The invention provides a structure that is much simpler, easier to implement, which requires reasonable read laser power, and which may be subjected to numerous read cycles without substantial degradation of the read signal. The structure according to the invention relies directly on the non-linear properties of certain materials without which it would be necessary to subject them to a bubble expansion regime that is too difficult to control.

According to the invention, a structure for high-resolution optical information storage is provided, comprising a substrate equipped with physical marks whose geometrical configuration defines the recorded information, a superposition of three layers on top of the substrate marks, and a transparent protective layer on top of this superposition, the superposition comprising a layer of indium or gallium antimonide inserted between two dielectric layers of a zinc sulfide and silicon oxide ($ZnS/SiO_2$) compound, the antimonide layer having a polycrystalline structure with an average crystal grain size between 5 and 50 nanometers.

It has been observed that the presence of the ZnS/SiO$_2$ layers around this antimonide layer makes it possible to considerably reduce the read laser power necessary to read the super-resolution information with a satisfactory signal/noise ratio. However, the question of the read power is critical as, on the one hand, a relatively high power is necessary to obtain a super-resolution effect via a localized change of the optical properties, but on the other hand, a high power tends gradually to destroy the information recorded, limiting the number of read cycles possible whereas as high a number of read cycles as possible is desired.

The thickness of the antimonide layer is close to the size of the grains, so that the layer is practically composed of a single layer of crystalline grains that are juxtaposed laterally and are not stacked up. The thickness of the InSb or GaSb layer is preferably around 10 to 50 nanometers and, optimally, between 20 and 30 nanometers. Typically, the antimonide layer has a thickness of around 20 nanometers and the grain size is close to 20 nanometers.

It has been observed that this large particle size of the active antimonide layer permits reading of super-resolution information.

Preferably, the substrate is made of polycarbonate, a plastic or a polymer.

The atomic proportions of antimony in the compound are preferably around 45% to 55%; the proportion of indium or gallium is then between 45% and the balance of the antimony proportion from 100%. A stoichiometric compound $In_{50}Sb_{50}$ or $Ga_{50}Sb_{50}$ is particularly suitable, but small differences in the stoichiometry are acceptable.

The ZnS-SiO$_2$ dielectric layers preferably each have a thickness between 20 and 100 nanometers and, optimally between 50 and 70 nanometers. The atomic proportion of ZnS and of SiO$_2$ is preferably chosen from the range between $ZnS_{85\ at\ \%}/SiO_{2\ 15\ at\ \%}$ (85/15 ratio) and $ZnS_{70\ at\ \%}/SiO_{2\ 30\ at\ \%}$ (70/30 ratio).

According to one important aspect of the invention, it is also proposed to add, to the active indium or gallium antimonide layer, impurities in a percentage which may vary between 1 and 15%, these impurities serving to reduce the electron mobility in the layer. These impurities may be the following: tellurium, selenium, sulfur, arsenic, phosphorus, nitrogen, xenon, fluorine, bromine, chlorine and iodine.

The invention is particularly applicable for reading information with a blue laser, typically with a wavelength of around 400 nanometers, the information prerecorded onto the optical disk possibly then having a size (width and length) of 100 nanometers or less, that is to say four to five times smaller than the read wavelength. But the invention is also applicable for reading using a red laser (wavelengths of 600 to 800 nanometers), which is very advantageous for allowing compatibility with conventional optical disk readers of standard resolution: one and the same reader may read disks bearing information of a standard resolution and disks bearing super-resolution information.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF DRAWINGS

The present invention is illustrated by way of example, and not by limitation, in the figures of the accompanying drawings, wherein elements having the same reference numeral designations represent like elements throughout and wherein.

DETAILED DESCRIPTION OF PREFERRED EMBODIMENTS

Figure 1:
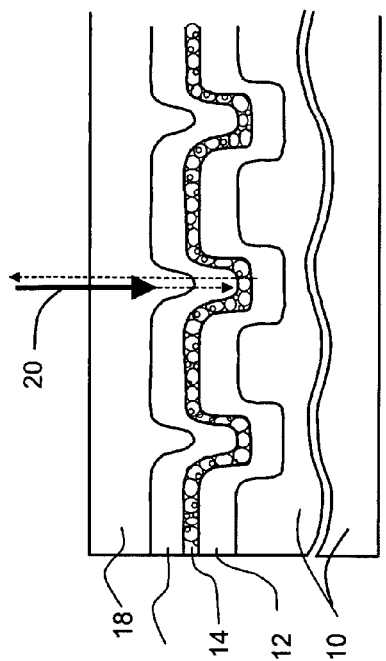
FIG. 1 represents the optical information storage structure according to the invention.

Represented in FIG. 1 is the general structure of the optical storage information medium according to the invention. It comprises a substrate 10, which is preferably an organic material, and notably polycarbonate conventionally used for optical disks. The substrate will, in practice, be in flat disk form and the information is conventionally written onto the disk along substantially concentric tracks; a read laser beam, symbolized by the arrow 20, placed in front of the disk will see the information pass in front of it during the rotation of the disk.

The substrate 10 comprises physical marks that define the information recorded, and in this example, the physical marks are constituted in the form of a relief imprinted into the upper surface of the substrate. The relief is, for example, composed of pits whose width is more or less fixed for all the information written, but whose length and spacing, in the run direction of the information define the content of the written information. Reading of the information is carried out by analysis of the phase of the laser beam reflected by the structure, a phase which varies at the start and at the end of passing of each physical mark. The pass by pits may be prerecorded by pressing the polycarbonate or the plastic substrate, for example, using a nickel mold which has been produced from very high-resolution electron-beam etching tools.

The width, length and spacing of the physical marks may be less than the theoretical optical resolution of the optical read system which will be used to read them. Typically, when this is a blue laser with a wavelength of around 400 nanometers, used with a focusing optic whose numerical aperture is 0.85, the theoretical physical resolution limit is around 120 nanometers. Here, the marks may be prerecorded with a resolution, in terms of length or spacing, of less than 80 nanometers.

In the case of a conventional optical disk, the relief would be covered with a simple layer of aluminum, but this aluminum layer would not make it possible to detect, with a blue laser, marks with dimensions and spacing equal to 100 nanometers.

According to the invention, the marks are covered with three layers composed, in order, of a dielectric layer 12 of ZnS-SiO$_2$ compound, a layer 14 of indium antimonide (InSb) or gallium antimonide (GaSb), and a dielectric layer 16 of ZnS/SiO$_2$ compound. The assembly is covered by a transparent protective layer 18.

The layer 14 made of InSb or GaSb is a layer with nonlinear optical properties and it has been observed that the reflexivity of the three-layer structure, GaSb or InSb layer surrounded by the two ZnS/SiO$_2$ dielectric layers may increase very significantly when it is illuminated by a laser beam having a power of 1 to 2 milliwatts (corresponding in practice to a power density of around 7 milliwatts square micron).

By way of example, the lower layer 12 of ZnS/SiO$_2$ has a thickness of 70 nanometers, it contains around 80% ZnS per 20% SiO$_2$ (in atomic percentages). The upper layer 16 has the same composition and a thickness of 50 nanometers. The intermediate layer is made of InSb with a thickness of 20 nanometers and an approximately stoichiometric composition. The InSb layer is highly polycrystalline, and the average grain size is more or less equal to the thickness of the layer, which is symbolized in FIG. 1 by a single layer formation of juxtaposed grains.

Figure 2:
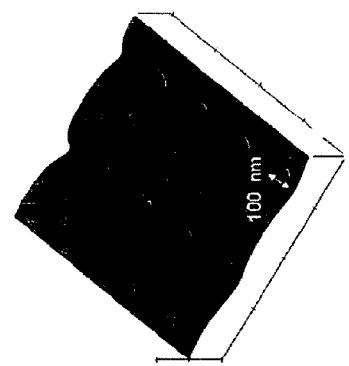
FIG. 2 represents an atomic force microscope view of a substrate in which marks of 100 nanometers spaced apart by 100 nanometers have been preformed.

FIG. 2 recalls the manner in which the information prerecorded onto the substrate, before deposition of the superposition of three layers 12, 14, 16 may be constituted: blind holes of variable length and spacing. In this example, an experimental sample with holes of 100 nanometers regularly spaced 100 nanometers apart is represented.

The tests carried out have shown that, both for a blue laser and for a red laser, the optimal thicknesses of the layers of the structure according to the invention are the following:
  lower ZnS/SiO$_2$ layer: around 50 to 70 nanometers;
  GaSb or InSb layer: around 20 to 30 nanometers, the crystal grain size is then preferably more or less equal to 20 nanometers on average; and
  upper ZnS/SiO$_2$ layer: around 50 to 60 nanometers.

The preferred atomic composition for the ZnS-SiO$_2$ compound is around 80% ZnS per 20% SiO$_2$.

Figure 3:
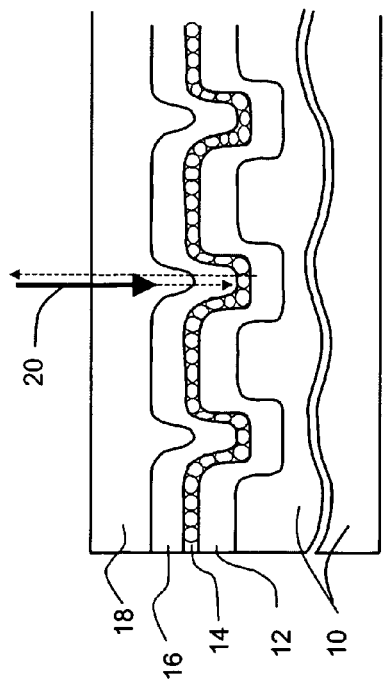
FIG. 3 represents a curve showing an improvement in the signal and in the contrast-to-noise ratio after the first readings.

It has also been observed that the effectiveness of reading the marks tends to improve as the readings are made. FIG. 3 represents two measurement curves plotted as a function of the number of readings carried out at the optimal read laser power for super-resolution reading; the first (lower curve, right-hand scale on the figure) represents the amplitude of the periodic signal read on return: this amplitude substantially increases after a few readings; the second curve (upper curve, left-hand scale) represents the carrier noise ratio CNR in decibels, which also increases after the first readings. It is thought that the read laser has an influence on the growth of the crystal grains of the antimonide layer and that it tends to intensify the formation of sufficiently large grains, having a diameter of a few tens of nanometers.

X-ray diffraction spectroscopy measurements tend to confirm this development: specific deflection peaks appear after a few readings (about ten), the fineness of these peaks tending to show the existence of grains having a diameter of a few tens of nanometers in the antimonide layer. These peaks tend to become finer as soon as the first readings of the recording media are made, tending to show an increase in the size of the individual crystals (after about ten readings, it is observed that the grains are more or less two times larger than after two readings).

The first readings therefore contribute to crystallizing the antimonide layer by giving it the particle size that is most favorable to the quality of super-resolution reading.

Figure 4:
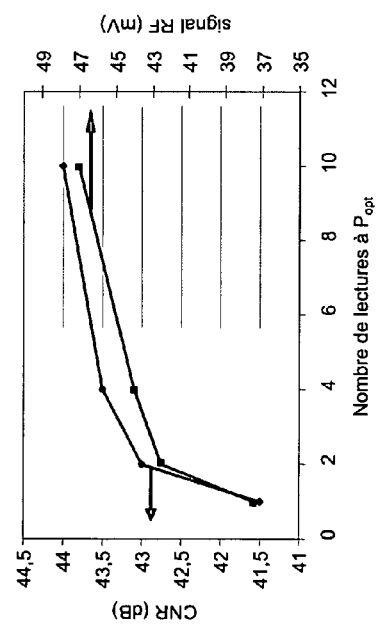
FIG. 4 represents a structure in which impurities have been mixed with the indium or gallium antimonide layer.

It is possible further to improve the reading by incorporating, into the antimonide layer, impurities whose role is to reduce the electron mobility between polycrystalline grains. These impurities are in a large amount (1 to 15%); it is therefore not a question of doping the antimonide but of incorporating an additional material into the layer. FIG. 4 symbolically represents this addition of impurities in the form of small additional grains positioned between the InSb or GaSb grains which were present alone in the case of FIG. 1. The impurities are chosen from the following list: Te, Se, S, As, P, N, Xe, F, Br, Cl, I.

The deposition of the indium or gallium antimonide layer is preferably carried out by sputtering from a target comprising the desired materials (typically $In_{50\ at\ \%}Sb_{50\ at\ \%}$). The deposition pressure may be around $3\times10^{-3}$ millibar and the direct current intensity around 80 mA, typically 78 mA.

The ZnS-SiO$_2$ layers may be deposited by sputtering or by plasma-enhanced vapor deposition.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A structure for high-resolution optical storage of information, comprising:
  a substrate having a flat surface with a relief comprising physical marks, the physical marks geometrical configuration defining the recorded information,
  a superposition of three layers on top of the substrate marks, and a transparent protective layer on top of this superposition, the superposition comprising a layer of indium or gallium antimonide inserted between two dielectric layers of a zinc sulfide and silicon oxide (ZnS/SiO$_2$) compound, wherein the antimonide layer has a polycrystalline structure with an average crystal grain size between 5 and 50 nanometers.

2. The structure as claimed in claim 1, wherein the atomic proportions of antimony in the antimonide layer are from 45% to 55%, the proportion of indium or of gallium being between 45% and the balance of the antimony proportion from 100%.

3. The structure as claimed in claim 2, wherein the antimonide layer is a stoichiometric InSb or GaSb layer.

4. The structure as claimed in claim 1, wherein the thickness of the InSb or GaSb antimonide layer is from 10 to 50 nanometers and the average crystal grain size is approximately equal to this thickness.

5. The structure as claimed in claim 4, wherein the thickness of the InSb or GaSb antimonide layer is from 20 to 30 nanometers and the average crystal grain size is around 20 nanometers.

6. The structure as claimed in claim 1, wherein the ZnS/SiO$_2$ dielectric layers each have a thickness between 20 and 100 nanometers.

7. The structure as claimed in claim 6, wherein the lower ZnS/SiO$_2$ layer covering the substrate marks has a thickness of around 50 to 70 nanometers.

8. The structure as claimed in claim 6, wherein the upper ZnS/SiO$_2$ layer has a thickness of around 50 to 60 nanometers.

9. The structure as claimed in claim 1, wherein the atomic proportion of ZnS and of SiO$_2$ is chosen from the range between $ZnS_{85\ at\ \%}/SiO_{2\ at\ \%}$ (85/15 ratio) and $ZnS_{70\ at\ \%}/SiO_{2\ 30\ at\ \%}$ (70/30 ratio).

10. The structure as claimed in claim 1, wherein the active indium or gallium antimonide layer additionally comprises impurities in a percentage which may vary between 1 and 15%, these impurities serving to reduce the electron mobility in the layer and being taken from the following group: tellurium, selenium, sulfur, arsenic, phosphorus, nitrogen, xenon, fluorine, bromine, chlorine and iodine.

11. The structure according to claim 1, wherein the substrate is an optical disc, and said physical marks have a length and a width below 100 nanometers.

12. The structure as claimed in claim 7, wherein the upper ZnS/SiO$_2$ layer has a thickness of around 50 to 60 nanometers.

13. The structure as claimed in claim 11, wherein the atomic proportions of antimony in the antimonide layer are from 45% to 55%, the proportion of indium or of gallium being between 45% and the balance of the antimony proportion from 100%.

14. The structure as claimed in claim 13, wherein the antimonide layer is a stoichiometric InSb or GaSb layer.

15. The structure as claimed in claim 11, wherein the thickness of the InSb or GaSb antimonide layer is from 10 to 50 nanometers and the average crystal grain size is approximately equal to this thickness.

16. The structure as claimed in claim 15, wherein the thickness of the InSb or GaSb antimonide layer is from 20 to 30 nanometers and the average crystal grain size is around 20 nanometers.

17. The structure as claimed in claim 11, wherein the ZnS/SiO$_2$ dielectric layers each have a thickness between 20 and 100 nanometers.

18. The structure as claimed in claim 17, wherein the lower ZnS/SiO$_2$ layer covering the substrate marks has a thickness of around 50 to 70 nanometers.

19. The structure as claimed in claim 17, wherein the upper ZnS/SiO$_2$ layer has a thickness of around 50 to 60 nanometers.

20. The structure as claimed in claim 11, wherein the atomic proportion of ZnS and of SiO$_2$ is chosen from the range between ZnS$_{85\ at\ \%}$/SiO$_{2\ 15\ at\ \%}$ (85/15 ratio) and ZnS$_{70\ at\ \%}$/SiO$_{2\ 30\ at\ \%}$ (70/30 ratio).

* * * * *